E. T. R. MURRAY & G. F. SHOTTER.
CIRCUIT BREAKER.
APPLICATION FILED MAR. 24, 1916.

1,262,234.

Patented Apr. 9, 1918.
2 SHEETS—SHEET 1.

Inventors
Ethelbert T. R. Murray
George F. Shotter

Attorney

Inventors
Ethelbert T. R. Murray
George F. Shotter
Attorney

UNITED STATES PATENT OFFICE.

ETHELBERT THOMAS RUTHVEN MURRAY, OF RADLETT, AND GEORGE FREDERICK SHOTTER, OF STREATHAM, LONDON, ENGLAND.

CIRCUIT-BREAKER.

1,262,234.  Specification of Letters Patent.  Patented Apr. 9, 1918.

Application filed March 24, 1916. Serial No. 86,458.

*To all whom it may concern:*

Be it known that we, ETHELBERT THOMAS RUTHVEN MURRAY and GEORGE FREDERICK SHOTTER, subjects of the King of Great Britain, residing at, respectively, Radlett, Hertfordshire, and Streatham, London, England, have invented certain new and useful Improvements in and Relating to Circuit-Breakers, of which the following is a specification.

This invention relates to devices for preventing or indicating the existence of an excessive current in an electric circuit and is particularly although not exclusively applicable to apparatus of this kind adapted to determine the charges incurred by a consumer of electrical energy.

Apparatus of the kind to which the invention relates usually consists of an automatic switch arranged to be electro-magnetically operated or released in such a manner as to interrupt the circuit to be controlled when the latter is traversed by a predetermined current or to include either intermittently or continuously in the circuit a resistance of such magnitude as considerably to reduce the current flow, thereby either giving an indication that the circuit conditions are such as to cause an excessive flow of current or positively preventing such excessive current.

In certain cases temporary abnormal circuit conditions may exist which while causing a transient excessive flow of current are rapidly succeeded by permanent conditions which do not involve a flow of current greater than the predetermined limit. For instance, when a circuit containing metal filament lamps is first completed the current traversing the circuit is considerably greater than the current subsequently continuously flowing (due to the now well-known effect of "overshooting").

In such cases it will be evident that the use of a current limiting device of the usual character would be disadvantageous inasmuch as the initial current when the circuit is first closed would effect the operation of the device improperly.

The present invention has for its object to overcome this difficulty and to provide an improved construction of apparatus which, while responsive to a permanent excess of current beyond a predetermined value, will not operate for initial or temporary excessive surges of current.

According to the present invention this result is attained by providing an alternative circuit or path for the current through the device in parallel to that controlled by the automatic switch. This alternative circuit is also controlled by a switch (hereinafter termed the alternative switch) which is arranged to be opened only when the automatic switch is reclosed after an excessive flow of current has caused it to open. The closing movement of the alternative switch is arranged to occur only after a predetermined interval of time has elapsed from its opening.

In the event therefore of a temporary excessive current causing the automatic switch to open, the circuit will be maintained through the closed alternative switch which is only opened after the automatic switch is reclosed so that the two switches are not opened simultaneously under these conditions.

A persistent excessive current will however cause the automatic switch to reopen directly after its closure and before the alternative switch has reclosed thereby causing both parallel circuits to be open simultaneously so that the necessary indication or operation of the device will be effected.

The invention is illustrated in the accompanying drawings, in which—

Figure 1:
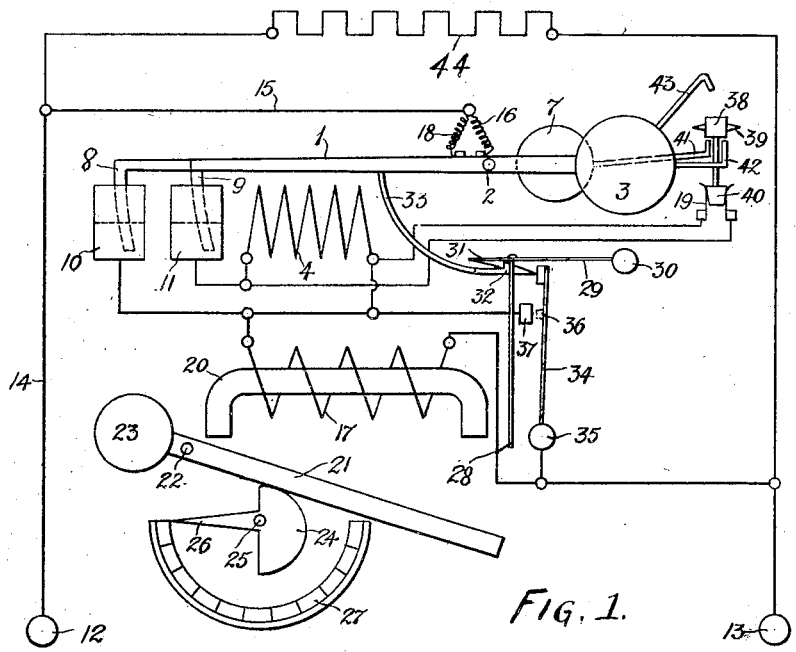
Figure 1 is a view in side elevation (but to a large extent diagrammatic) of an apparatus adapted to determine the charges incurred by a consumer of electrical energy.
Figure 2:
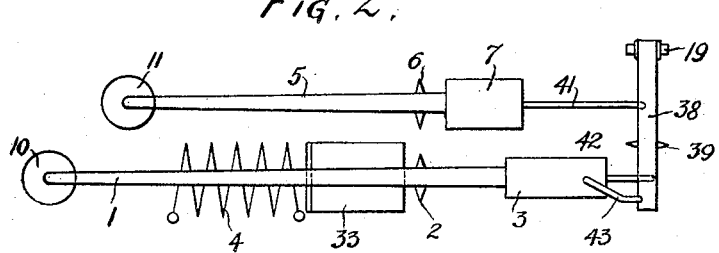
Figs. 2 and 3 are views in plan and end elevation respectively of portions of the mechanism illustrated in Fig. 1.
Figure 3:
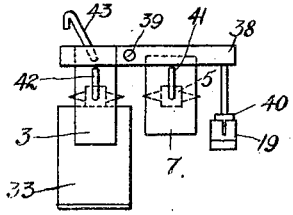

Referring now first to Figs. 1 to 3 inclusive, it will be seen that the apparatus comprises an automatic switch consisting of a switch arm 1 pivotally mounted as indicated at 2 and provided with a counter weight 3. The switch arm 1 is adapted to be moved to its open position under the action of gravity, being moved to its closed position as shown in the drawings, by a resetting coil indicated diagrammatically at 4 and armature 33 when this coil is energized, as will be hereinafter explained.

The alternative switch above referred to comprises a similar switch arm 5 pivotally mounted at 6 and provided with a suitable counter weight 7, this arm being however so counter-balanced as to move to its closed position shown in the drawings under the action of gravity.

The automatic switch arms 1 and 5 are each provided with contact members indicated at 8 and 9 respectively adapted when the switch arms are in their closed position to dip into corresponding mercury cups 10 and 11, and thus complete two parallel circuits through the apparatus between the terminals 12 and 13. These two circuits may be traced as follows.

From the terminal 12 through the conductors 14, 15 the flexible conductor 16, the automatic switch arm 1, contact member 8, mercury cup 10, through the energizing winding 17 of the tripping mechanism to the other terminal 13, the parallel circuit being through the flexible conductor 18, the alternative switch arm 5, contact member 9, mercury cup 11, switch device 19 which is closed in the position shown in the drawings, the energizing coil 17 of the tripping mechanism to the other terminal 13 of the apparatus.

The tripping mechanism above referred to comprises a fixed core or armature 20 surrounded by the energizing coil 17 and provided with a movable armature 21 pivotally mounted at 22 and provided with a suitable counter-weight 23, the armature 21 being so balanced as normally to rest in its unattracted position shown in Fig. 1 against the edge of a snail or cam 24 rotatably mounted at 25 and provided with a pointer 26. The snail or cam 24 is adapted to be rotatably adjusted to any desired position indicated by the pointer 26 and a graduated scale 27, the unattracted position of the armature 21 being thereby determined by the operative surface of the snail or cam, so that the air gap separating the armature 21 from the fixed core 20 when the coil 17 is de-energized can be arranged to have any desired value.

This portion of the apparatus is preferably constructed as described in our co-pending application Serial Number 86,322, to which reference may be made for a more complete description, and the armature 21 is arranged when in its attracted position to engage with a lower end of a striker pin 28, the upper end of which is connected to a resilient strip 29 one end of which is rigidly secured to the frame of the apparatus as indicated at 30 the opposite end of the resilient strip 29 carrying a release catch 31. The latter is adapted when in its normal position as shown in the drawings to engage with a corresponding catch 32 mounted upon one end of the armature 33, the opposite end of which is secured to the automatic switch arm 1, the catch 31 thus serving to maintain this switch arm in its closed position, as shown in the drawings, until released by the action of the armature 21 upon the striker pin 28.

The catch 32 is also arranged when in the position shown in the drawings to engage with one end of a resilient strip 34, the opposite end of which is rigidly mounted on the frame of the apparatus as indicated at 35, and carries at an intermediate point in its length a switch contact 36. A corresponding fixed switch contact 37 is adapted to be engaged by the contact 36 when the catch 32 moves out of engagement with the resilient strip 34, thereby short circuiting coil 17 as will be clearly understood from an inspection of Fig. 1.

Mounted at the right of the apparatus as shown in Figs. 1 to 3 of the drawings is a rocking lever or cross arm 38, pivotally mounted at 39 and provided at one end with a contact member 40 adapted to close the switch device 19 when the parts are in the position shown. The rocking lever or cross arm 38 is adapted to be moved from one to the other of its extreme positions by means of projecting pins indicated at 41 and 42, mounted upon the switch arms 5 and 1 respectively, the latter switch arm being also provided with an upwardly extending pin 43.

Connected in shunt across the terminals 12, 13 of the apparatus is a dimmer resistance or other indicating device shown diagrammatically at 44 in Fig. 1.

The operation of the apparatus is as follows:—Assuming that the apparatus is in its normal condition with both the switch arms 1 and 5 in their closed position as shown in the drawings, the current traversing the consumer's circuit will pass through the two parallel circuits above described between the terminals 12 and 13 of the apparatus and thus traverse the energizing coil 17 of the tripping mechanism. In the event of this current increasing to a value sufficient to operate the tripping mechanism, which value is determined by the adjustment of the cam or snail 24, the armature 21 of this mechanism will be attracted by the fixed core 20 and will move upward until it comes into contact with the lower end of the striker pin 28 which is thereby raised to a small extent. The catch 31 will be released by this movement from engagement with the corresponding catch 32 carried on the armature 33 and the switch arm 1 will consequently be free to move to its open position under the action of gravity.

The opening movement of the switch arm 1 will continue until the pin 43 comes into contact with the corresponding end of the rocking lever 38, thereby causing the latter to be depressed and the opposite end of the rocking lever to be raised carrying with it the contact member 40 and thus opening the switch device 19.

The operation of this switch device, which in its closed position short circuits the resetting coil 4 will evidently permit this coil to be energized, and thereby effect the reclosing of the switch arm 1, it being understood that since the pin 43 does not actuate the rocking lever 38 until the switch arm 1 is moved to its extreme open position, this switch arm will complete the full extent of its opening movement before the resetting coil 4 is energized to return the switch arm to its closed position. The downward movement of the switch arm 1 when nearly completed causes the pin 42 to engage with the rocking lever 38 and to return the latter to its original position in which the switch 19 is reclosed and this movement of the rocking lever 38 causes the rocking lever to engage with the pin 41 carried by the alternative switch arm 5. The impact of the rocking lever 38 upon the pin 41 serves to impart an opening movement to the alternative switch arm 5 against the action of gravity and this switch arm accordingly performs an opening movement followed by a reclosing movement, the duration of the interval of time during which the alternative switch arm 5 is open being arranged to be relatively longer than the interval necessary for the reclosing of the automatic switch arm 1.

In the event therefore of a temporary excessive flow of current a direct circuit between the terminals 12, 13 of the apparatus other than that constituted by the dimmer resistance 44 is provided since, although the opening of the automatic switch arm 1 interrupts one of the parallel circuits, viz., that including the switch arm 1 and mercury cup 10, the other parallel circuit, viz., that including the alternative switch arm 5 and the mercury cup 11 is still unbroken, since the alternative switch arm 5 does not commence its opening movement until the automatic switch arm 1 is reclosed. Assuming that by the time this latter action has taken place the current traversing the circuit is no longer excessive, the automatic switch arm 1 will not be again released since the current will be insufficient to operate the tripping mechanism and the alternative switch arm 5 will complete its opening and closing movement without having any effect upon the continuity of the circuit. If however the excessive flow of current is of a more permanent nature due for instance to a permanent load on the circuit of a magnitude greater than that for which the cam or snail 24 is adjusted, the armature 21 will return to its attracted position and the catch 32 will not be engaged by the catch 31 when the automatic switch arm 1 is reclosed. Consequently the automatic switch arm 1 will immediately upon being reclosed commence a second opening movement owing to the fact that its reclosing has short circuited the resetting coil 4 by means of the switch device 19, and this second opening movement of the automatic switch arm will evidently take place during the time at which the alternative switch arm 5 is also performing its opening and reclosing movement, so that both parallel circuits through the apparatus will be interrupted simultaneously. The only circuit between the terminals 12 and 13 will under these conditions be constituted by the dimmer resistance 44 and the current through the consumer's circuit will be consequently considerably reduced owing to the inclusion of this resistance in circuit. The return of the alternative switch arm 5 to its closed position will short circuit the dimmer resistance 44 and energize the resetting coil 4 thereby causing the switch arm 1 to return to its closed position, but the continued persistence of the overload in the consumer's circuit will evidently cause the automatic switch arm 1 to re-open as soon as it is closed and the alternative switch arm 5 being also opened by the return of the automatic switch arm as above described, the consumer's circuit will intermittently include the dimmer resistance 44, thus producing a flicker in the lamps constituting the load and indicating to the consumer that an excessive amount of current is being demanded. The switch contacts 36 and 37 are provided for the purpose of insuring that the armature 21 of the tripping mechanism shall return to its unattracted position at each opening movement of the automatic switch arm 1 so as to prevent the armature being continuously held in its attracted position by the current traversing the energizing coil 17.

It will be observed that in the arrangement shown in Fig. 1 the energizing coil 17 of the tripping mechanism is traversed by the current passing through both of the parallel circuits. This however is not essential and in the modified arrangements shown in Figs. 4 and 5 the energizing coil 17 is connected in one of the parallel circuits only, viz., that controlled by the automatic switch arm 1.

Figure 4:
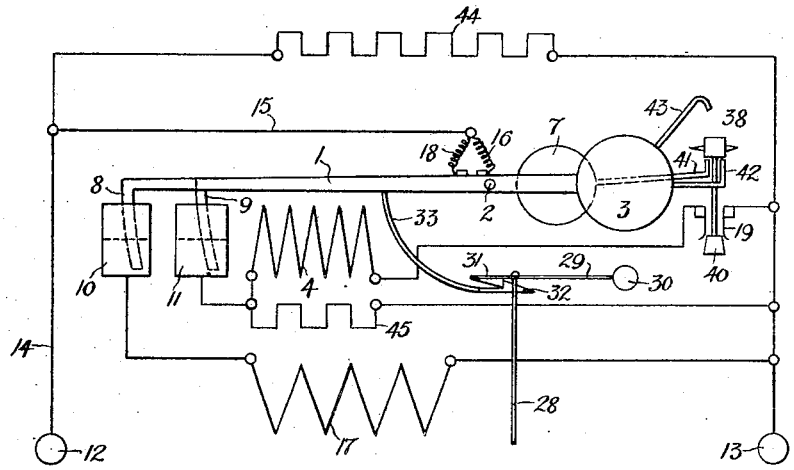
Figs. 4 and 5 are views similar to Fig. 1 but illustrating modified forms of connections.

Referring first to the arrangement shown in Fig. 4, it will be seen that instead of the resetting coil 4 being short circuited by the action of the switch mechanism 19, the circuit of this coil is directly controlled by the switch mechanism 19, the contact member 40 being arranged to close the circuit of the resetting coil 4 only when the rocking lever 38 is displaced from its normal position by the reclosing of the automatic switch arm 1. A parallel circuit to that through the resetting coil 4 and switch mechanism 19 is provided which includes a resistance 45 so that practically the whole of the current in the consumer's circuit will pass through the coil 17 under normal conditions.

Figure 5:
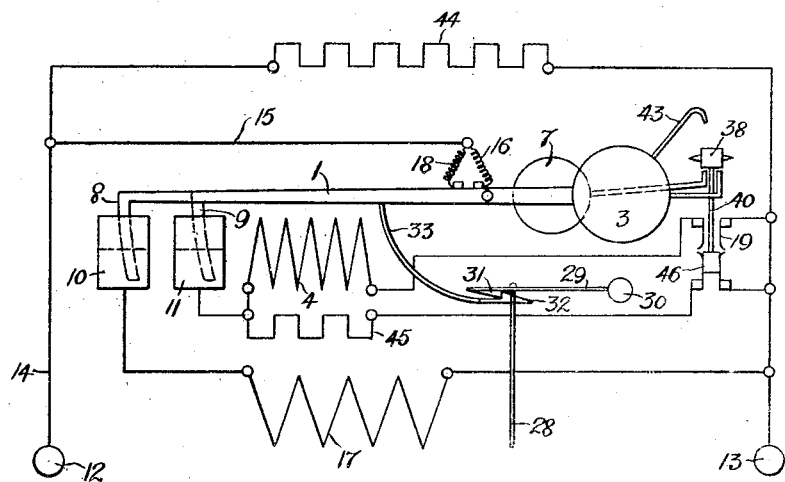

The operation of this form of the invention is substantially the same as that already described with reference to Fig. 1, the tripping mechanism employed being the same. Fig. 5 illustrates a modification of the arrangement shown in Fig. 4 in which a second switch mechanism 46 operated by the contact member 40 is provided, the latter serving to connect either the resetting coil 4 or an equivalent resistance 45 in the circuit controlled by the alternative switch arm 5 according to whether the rocking lever 38 is in one or other of its extreme positions. In other respects the operation of this arrangement is the same as that of the arrangement already described.

It will be understood that the form and arrangement of the mechanism as well as the electrical connections of the various elements of the apparatus may be modified as required to meet particular conditions and the invention is not to be regarded as limited to any particular constructional details or design.

What we claim is:—

1. A circuit breaker comprising two normally closed contacts, a circuit including said contacts in parallel and a resistance connected in parallel with said contacts, means for opening one of said contacts when current of a value temporarily exceeding a predetermined value traverses said circuit, and means for continuously and simultaneously opening and closing both of said contacts when a current of a value constantly exceeding the predetermined value traverses said circuit.

2. A circuit breaker comprising a pair of contact arms one of which is biased to open positions, means for latching one of said arms in closed position against its bias, a resistance, a circuit including said contact arms and said resistance in parallel, means for releasing said arm when said circuit is traversed by current of a predetermined value, and means for opening the other of said contact arms upon closure of the first-mentioned contact arm.

3. A circuit breaker comprising two normally closed contacts, a resistance, a circuit including said contact and said resistance in parallel means for opening one of said contacts when current of a value temporarily exceeding a predetermined value traverses said circuit, and for opening both of said contacts when current of a value constantly exceeding a predetermined value traverses said circuit.

4. A circuit breaker comprising a counterbalanced lever, a second lever biased to one extreme position, means for holding said second lever in another extreme position against its bias, means for returning the second lever to the second extreme position after said retaining means is released, and means interposed between said levers for moving the first lever as the second lever is returning to its second extreme position.

In testimony whereof we have hereunto set out hands in presence of two subscribing witnesses.

ETHELBERT THOMAS RUTHVEN MURRAY.
GEORGE FREDERICK SHOTTER.

Witnesses:
 FRANK J. AMES,
 HERBERT D. JAMESON.

Copies of this patent may be obtained for five cents each, by addressing the "Commissioner of Patents, Washington, D. C."